United States Patent

Litt et al.

[15] 3,681,329

[45] Aug. 1, 1972

[54] PROCESS FOR THE PREPARATION OF CYCLIC IMINOETHERS

[72] Inventors: Morton H. Litt, Cleveland, Ohio; Richard B. Lund, Toms River; John Vitrone, Parsippany, both of N.J.; Jack L. Herz, Scarsdale, N.Y.

[73] Assignee: Allied Chemical Corporation, New York, N.Y.

[22] Filed: May 4, 1970

[21] Appl. No.: 34,566

Related U.S. Application Data

[63] Continuation-in-part of Ser. No. 655,291, July 24, 1967.

[52] U.S. Cl. ........... 260/244 R, 260/307 F, 260/404, 260/429 R, 260/429.2, 260/439, 260/468 R, 260/473 R, 260/476 R, 260/484 R, 260/486 R, 260/487, 260/488 R, 260/557 R, 260/558 R, 260/559 R, 260/561 R, 260/561 N, 260/561 B, 260/561 HL, 260/561 K

[51] Int. Cl. ................. C07d 85/36, C07d 87/14

[58] Field of Search ............... 260/244 R, 307 F

[56] References Cited

UNITED STATES PATENTS

| | | |
|---|---|---|
| 2,312,414 | 3/1943 | Jayne et al. .............. 260/307 F |
| 2,416,552 | 2/1947 | Valko ...................... 260/307 F |
| 2,450,807 | 10/1948 | McCarthy ................. 260/307 F |
| 2,530,627 | 11/1950 | Pfister et al. ............. 260/307 F |
| 2,564,423 | 8/1951 | Barnum .................... 260/307 F |
| 2,844,589 | 7/1958 | Hess ........................ 260/307 F |
| 3,268,544 | 8/1966 | Thompson et al. ....... 260/307 F |
| 3,562,263 | 2/1971 | Litt et al. .................. 260/244 R |

OTHER PUBLICATIONS

Ralston Fatty Acids and Their Derivatives, pages 129–131, N.Y., Wiley, 1948 QD305.A2R2

Wenker J. Amer. Chem. Soc., Vol. 57, pages 1079–1080 (1935) QD1.A5

De Benneville et al. German Application 1094749, 12–1960 (5 pages spec.) (Kl 12p3)

Primary Examiner—Natalie Trousof
Attorney—Arthur J. Plantamura and Herbert G. Burkard

[57] ABSTRACT

The liquid phase thermally induced cyclodehydration of N-(ω-hydroxyalkyl) alkyl and aryl carboxylamides to afford cyclic iminoethers is catalyzed by compounds of manganese, cobalt, molybdenum, tungsten and the rate earth metals.

7 Claims, No Drawings

PROCESS FOR THE PREPARATION OF CYCLIC IMINOETHERS

This application is a continuation-in-part of our previously filed co-pending application U.S. Ser. No. 655,291, filed July 24, 1967.

FIELD OF THE INVENTION

This invention relates to a novel process for the preparation of cyclic iminoethers and more particularly to a process for the preparation of cyclic iminoethers by the catalytic cyclodehydration of N-(**-hydroxyalkyl) alkyl and aryl carboxylamides.

Cyclic iminoethers, particularly 2-substituted-2-oxazolines and 2-oxazines are useful as solvents, plasticizers and the like, and additionally they can be polymerized to afford polymers of a wide range of molecular weights which are suitable for use in coatings, films, fibers and paints, as well as many other known polymer applications.

DESCRIPTION OF THE PRIOR ART

Cyclic iminoethers have hitherto been prepared by several methods, but none is completely satisfactory. Thermally induced cyclodehydration of N-($\beta$-hydroxyethyl)amides affords short chain 2-alkyl-substituted-2-oxazolines such as 2-methyl-2-oxazoline and 2-ethyl-2-oxazoline, in low yield. Attempts to prepare long chain alkyl or aryl substituted 2-oxazolines such as 2-phenyl-2-oxazoline by this method were unsuccessful. Use of an equimolar amount of a dehydration agent such as phosphorus pentoxide enables one to prepare 2-phenyl-2-oxazoline by cyclodehydration but only in very low yield. $\Delta^2$—Oxazoline has been prepared using dehydrating agents such as sulfuric acid and iron oxide. 2-Substituted-2sodium tetraborate catalyst.

Oxazines and oxazolines can be prepared by cyclodehydration of N-($\beta$ or $\gamma$-hydroxyalkyl)amides by passing the amides in vaporous form over a heated catalyst such as silica, alumina, silica-alumina or magnesious silica in accordance with the method disclosed in U.S. Pat. No. 3,483,141. 3,483,141. This method, although efficient, requires high temperatures of reaction, on the order of 250° to 400° C., and high vacuum, which adds to the cost of this process.

Thus, a simple and inexpensive process for the preparation of cyclic iminoethers which utilizes readily available starting materials and moderate reaction temperatures is desirable but has not hitherto been available.

SUMMARY OF THE INVENTION

It is an object of this invention to provide a novel, convenient process for the preparation of cyclic iminoethers.

It is another object of this invention to provide a liquid phase process for the preparation of cyclic iminoethers.

Further objects and advantages will become apparent from the description of the invention which follows in greater detail.

These and other objects are accomplished according to our invention wherein cyclic iminoethers having the formula:

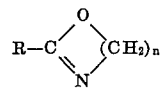

wherein R represents a substituent selected from the group consisting of hydrogen and aliphatic, alicyclic and aromatic hydrocarbon radicals having up to 20 carbon atoms, which hydrocarbon radicals may contain substituents which are inert under the reaction conditions, such as nitro, ether, ester, and halogen groups, and perfluoroalkyl-alkyl radicals having from one to 20 carbon atoms; and $n$ is 2 or 3, are prepared by heating a hydroxyalkyl amide having the formula

wherein R and $n$ are as defined above, at a temperature of from about 140° C. to about 300° C. in the presence of a catalyst material selected from the group consisting of both organic and inorganic compounds of the following metals: tungsten or molybdenum in the plus 4 to plus 6 valence state, manganese in the plus 3 or plus 4 state, cobalt in the plus 2 state and the rare earth metals in the plus 3 state.

The only limitation on the selection of compounds from the above-denominated group is that the compound must have a solubility of at least about 100 ppm. in the hydroxyamide at the cyclodehydration reaction temperature which as heretofore indicated is a maximum of 300° C. This excludes highly insoluble compounds of the above metals having a complex graphite lattice structure such as carbides, nitrides, silicides and the like.

Suitable inorganic compounds of the aforesaid metals include, but are not limited to oxides, sulfides, halides, acid salts and heteropoly compounds of the above-enumerated metals. Organic compounds, especially acid salts of these metals are likewise suitable. The only requirement for such inorganic and organic compounds is that the metal be in the hereinabove indicated valence state and also that such compounds have the required solubility in the hydroxy amide reactant.

The terms sulfide and halide as used herein contemplate not only simple sulfides and halides such as molybdenum disulfide ($MoS_2$) and manganese chloride but also oxy-sulfides and oxychlorides such as molybdenum oxytrichloride ($MoOCl_3$).

The term oxide, as applied to the catalyst material, contemplates not only simple oxides but also hydrated oxides. It should be noted that hydrated metal oxides may be either acidic or basic depending upon the particular metal and its valence state. For example, hydrated tungstic oxide ($WO_3 \cdot H_2O \equiv H_2WO_4$) is acidic.

The term inorganic acid salt contemplates both salts wherein the catalytically active metal is the cation as, for example, manganous carbonate and the like and also salts derived from the hydrated metal oxide wherein the catalytically active metal forms part of the anion, as for example, sodium molybdate, potassium tungstate and the like.

The term organic acid salt contemplates aliphatic, alicyclic and aromatic carboxylic acid salts of the above-indicated metals such as formates, acetates, benzoates, naphthenates, oxalates, acetylacetonates and also sulfonic acid salts of such metals such as the methyl, phenyl, p-toluene and p-bromobenzene sulfonates.

The term heteropoly compound connotes a salt or free acid containing a complex high molecular weight anion wherein the anion contains from 2 to 28 hexavalent molybdenum, tungsten or other polyvalent metal atoms around one or more central atoms, such as, for example, phosphorous or nickel. Such heteropoly compounds are extensively discussed in "Handbuch der Anorganischem Chemic", Vol. 4, Pt. 1, ii., Leipzig, 1921, pp. 977–1065, and in "Structural Chemistry of Inorganic Compounds", Vol. 1 Elsevier Publishing Company, New York, 1950, pp. 179—213.

Although compounds of other metals than those hereinabove enumerated will catalyze the cyclohydration to a certain extent, they are generally less suitable for use in this regard because yields of cyclized product are poor or because the product is frequently discolored and difficult to purify due to the necessity for prolonged heating to a high temperature to drive the reaction to completion or both. Inferior catalysts include compounds of the metals vanadium, niobium, lead, thorium, iron, uranium and arsenic.

Illustrative catalysts suitable for use in this invention include manganese dioxide, braunite ($Mn_2O_3$), hauerite ($MnS_2$), manganic chloride, hydroxide and sulfate; cobalt oxide and sulfide, cobaltous hydroxide, nitrate, sulfate, acetate and basic carbonate; tungsten di- and tri- oxide, hydrated tungsten trioxide (tungstic acid), heteropoly acids of tungsten such as sodium phosphotungstate ($Na_3PO_4 \cdot 12WO_3 \cdot XH_2O$), sodium, zirconium and lead tungstate, tungsten di- and tri-sulfide, tungsten oxytetrachloride, ammonium tetrathio tungstate, sodium-6oct-tungsto-Oct. nickelate, cesium monohydrogen 12oct-tungsto-tet-silicate, 12oct-tungsto-tet-silicic acid, tungsten pentabromide, molybdenum di- and tri- oxide, hydrated molybdenum pentoxide, molybdenum di- and tri- sulfide, ammonium paramolybdate, and molybdenum bis-acetyl-acetonate, molybdenum oxalate, tetrachloride, tetrachloride dipyridine, dioxydichloride, oxytetrachloride and oxytrichloride, heteropoly acids of molybdenum such as phosphomolybdic acid ($12MoO_3 \cdot H_3PO_4 \cdot XH_2O$) ammonium -9molybdonickelate, 6-molybdocobalate, 6-molybdoferrate, 5-molybdocobalate-3 and 6-molybdoaluminate and lead, cadmium, strontium and ammonium molybdate; lanthanum carbonate and chloride, cerium, neodymium, holmium and thulium oxalate, praseodymium and gadolinium acetylacetonate, lanthanium, neodymium, ytterbium, samarium, praseodymium and dysprosium oxide, samarium, europium and terbium oxalate, and dysprosium, erbium, and ytterbium acetate and the carbonates, oxides and chlorides of mixed rare earths, one preferred mixture being known as didymium and having the following approximate composition: La, 40—45%; Ce, 1—2%; Pr, 8—12%; Nd, 32—37%; Sm, 3—6%; Gd, 2—4%; Y, 0.2—1%; other rare earth metals, 1—2%.

Preferred catalysts are compounds of molybdenum and tungsten in the plus 4 to plus 6 valence state, of manganese in the plus 4 state and of the rare earth metals in the plus 3 valence state. Particularly preferred catalysts are molybdenum dioxide, phosphomomolybdic acid, alkali metal tungstates and molybdates, and manganese dioxide and didymium oxide.

The chemistry of the process, using hydrated tungstic oxide as an example of catalyst in the preparation of an oxazoline, is visualized to be as follows:

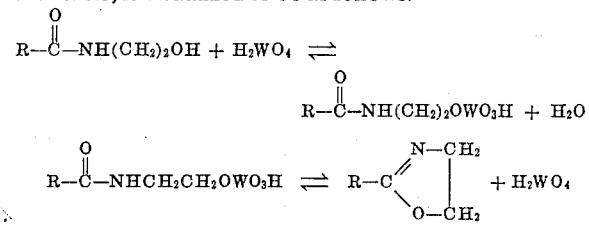

The yield and quality of the desired product is generally improved if an inorganic base is added along with the catalyst. Normally, approximately one mol of base per mol of catalyst is suitable. When the catalyst molecule contains halogen, the addition of one mol of base per mol of halogen is desirable. Suitable inorganic bases include alkali and alkaline earth metal carbonates, bicarbonates, hydroxides and oxides.

The term aliphatic as used hereinabove contemplates normal and branched chain saturated, olefinic and acetylenic hydrocarbon radicals, which may optionally contain substituent groups which are inert under the reaction conditions. Illustrative examples are methyl, ethyl, propyl, isopropyl, butyl, hexyl, heptyl, isooctyl, dodecyl, myristyl, stearyl, eicosyl, heptenyl, dodecenyl, octadecenyl, heptadecadienyl, heptadecatrienyl, acetoxyethyl and ethoxyethyl. Illustrative examples of suitable alicyclic hydrocarbon radicals are cyclopropyl, cyclopentyl, cyclohexyl, cyclododecyl, cycloheptenyl, methyl and isopropylcyclohexyl and the like. The term aromatic contemplates aryl, aralkyl and alkaryl radicals. Suitable illustrative examples are o-, m- and p-ethyl, propyl and butylphenyl, phenyl, $\alpha$ and $\beta$-naphthyl, benzyl, o-, m-, and p-tolyl, phenylethyl, o-, m- and p-methoxyphenyl, nitrophenyl, acylphenyl, p-chlorophenyl and the like.

The term jointed perfluoroalkyl-alkyl connotes a radical of the structure $CF_3(CF_2)_n(CH_2)_m-$ wherein $m$ and $n$ range from 0 to 10 and the sum of $m$ plus $n$ is from 1 to 20.

Illustrative examples of suitable jointed perfluoroalkylalkyl radicals include 10- perfluoroethyl, propyl, butyl, pentyl, hexyl, heptyl, octyl and decyl - decyl $[CF_3(CF_2)_n(Ch_2)_{10}-$ wherein $n$ is 1 to 9], 5-perfluorobutyl and heptyl - pentyl and perfluoroheptyl - ethyl, propyl, butyl and hexyl. The preparation of the perfluoroalkyl-alkyl acid precursors of the hydroxyamides is described in J. Org. Chem. 27, 4491 (1962).

DETAILED PROCEDURE

The cyclodehydration reaction is brought about simply by heating the hydroxyamide and catalyst together in a distillation apparatus; the oxazoline or oxazine distills out of the reaction flask as it forms, along with the by-product water.

Yield and product quality increases with reduced contact time. The preferred procedure is to add hydroxyamide continuously to an agitated mixture of catalyst and inorganic base suspended in a minimum amount of hydroxyamide heated to reaction temperature at reduced pressure so as to essentially flash off the reaction product as rapidly as it is formed through a short distillation column with a minimum carry over of unreacted hydroxyamide.

This procedure allows the use of a small reactor and permits good control of reaction conditions. The amount of hydroxyamide subjected to heat in the presence of catalyst is kept at a low level. Long heating periods, as would occur in a non-continuous addition process, are believed to result in the formation of by-products such as esteramides of the formula:

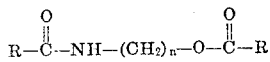

particularly in those cases where high reaction temperatures are required.

Although from as little as 0.01 to as much as 15 weight percent catalyst may be employed, the preferred quantity is less than about 2 percent by weight of catalyst based on the total amount of hydroxyamide reacted. The optimum reaction temperature ranges from about 180°–250°C. A high heat input is beneficial in reducing contact time and in increasing through-put.

Reduced pressures, i.e. below about 500 mm. of Hg, are also effective in decreasing contact time, thereby resulting in better yields. The optimum subatmospheric pressure will depend on the reactants and equipment used. It should be as low as possible without allowing uncyclized hydroxyamide to reflux or lowering the reaction temperature. The preferred range will thus depend on the particular hydroxyamide being reacted, e.g. for low boiling amides, the preferred range is from about 50 to about 250 mm., for high boiling amides from about 50 to about 0.1 mm.

The following specific examples further illustrate our invention. All parts are parts by weight unless otherwise expressly noted.

EXAMPLE 1

A wide variety of compounds were evaluated for activity as cyclodehydration catalysts by means of a standard screening test. These compounds and results therewith are presented in Table 1. The procedure used was to heat 30.0 grams of N-(β-hydroxyethyl)acetamide or propionamide with 3.0 grams of the catalyst material under test in a stirred distillation flask fitted with a thermometer, distillation head, condenser and receiver and collect the distillate. Since no fractionating column was employed, some hydroxamide was carried over into the receiver. The reaction flask was heated the same way in each test, i.e. the same rate of heating and amount of heat was applied. The constant heat input supplies energy for the reaction and distillation of the 2-methyl or 2-ethyl-2-oxazoline and water. Removal of oxazoline and water by distillation drives the reaction forward.

Catalytic activity was determined by a combined assessment of (1) the temperature at which 35 percent cyclodehydration occurred (the lower the temperature, the better the catalyst), (2) total yield of product, and (3) the product quality. The absence of contaminating by-products was judged by the amount of colorless distillate which could be obtained under the standard test conditions and by the degree of conversion of the reactants to distillable material. Dark colored distillate and low yield are an indication that undesirable side reactions are taking place. Colored distillate requires extensive purification to be suitable for use in the preparation of satisfactory polymer products. The number of milliliters of colorless distillate required, which was selected as a criterion, was 10 or more - less than this was considered as a showing of inferior catalytic activity in the screening test.

The improvement in yield of desired product achieved by the concomitant use of inorganic base is demonstrated, c.f. yield and reaction temperature of runs 18 and 19; 32 and 33; 36 and 37; and 51 and 52. In some instances, e.g. when $PbWO_4$, $WS_2$, $SuMoO_4$ and $MoS_2$ are used, although the cyclodehydration reaction temperature is not substantially reduced, the yield of colorless product is substantially increased in comcomparison with the case where no catalyst is used.

TABLE 1

| Run | Catalyst | Amide | Reaction Temperature (°C.) at 35% Conversion | Colorless Distillate (ml.) | Total Weight of Distillate, g. |
|---|---|---|---|---|---|
| 1 | None | A | 260 | 1 | 26.3 |
| 2 | None | B | 258 | 5 | 25.1 |
| 3 | Manganous carbonate, $MnCO_3$ | B | 232 | 25 | 25.9 |
| 4 | Manganese dioxide, $MnO_2$ | A | 235 | 20 | — |
| 5 | Manganese dioxide | B | 232 | 10 | 24.9 |
| 6 | Cobaltous acetate | B | 230 | 20 | 24.4 |
| 7 | Cobalt carbonate | B | 233 | 20 | 24.8 |
| 8 | Cobalt nitrate | B | 235 | 3 | 20.2 |
| 9 | Cobaltous hydroxide, $Co(OH)_2$ | A | 230 | 10 | 25.4 |
| 10 | Molybdenum trioxide | A | 224 | 25 | — |
| 11 | Molybdenum dioxide | A | 225 | 26.5 | — |
| 12 | Ammonium molybdate | B | 227 | 10 | 25.3 |
| 13 | Phosphomolybdic acid, $H_3PO_4 \cdot 12MoO_3 \cdot XH_2O$ | A | 222 | 20 | — |
| 14 | Molybdenum disulfide | B | 250 | 10 | 25.7 |
| 15 | Cadmium molybdate | B | 230 | 25 | 25.8 |
| 16 | Ammonium paramolybdate, $(NH_4)_6Mo_7O_{24} \cdot XH_2O$ | B | 238 | 20 | 23 |
| 17 | Strontium molybdate | B | 250 | 20 | 24.9 |
| 18 | Molybdenum oxytetrachloride | B | 275 | 5 | 20.1 |
| 19 | Molybdenum oxytetrachloride plus X | B | 232 | 25 | 25.5 |
| 20 | Molybdenum tetrachloride dipyridine | B | 240 | 20 | 27.9 |
| 21 | Molybdenum tetrachloride plus X | B | 246 | 15 | 27.2 |
| 22 | Molybdenum oxytrichloride plus X | B | 235 | 20 | 25.5 |
| 23 | Molybdenum dioxydichloride plus X | B | 238 | 15 | 24.7 |
| 24 | Molybdenum bis-acetyl-acetonate $MoO_2(C_5H_7O_2)_2$ | B | 246 | 10 | 26.7 |

| | | | | |
|---|---|---|---|---|
| 25 Molybdenum oxalate | B | 232 | 10 | 25.9 |
| 26 Ammonium 6-molybdo-cobaltate | B | 243 | 10 | 24.4 |
| 27 Ammonium 6-molybdo-ferrate | B | 235 | 15 | 24.3 |
| 28 Ammonium 5-molybdo-2-cobaltate | B | 240 | 10 | 22.6 |
| 29 Ammonium 6-molybdo-aluminate | B | 235 | 15 | 26.6 |
| 30 Ammonium 9-molybdo-nickelate, $(NH_4)_6[NiMo_9O_{32}]\cdot 6\frac{1}{2}\cdot H_2O$ | B | 237 | 22 | — |
| 31 Tungstic acid (hydrated trioxide) $WO_3\cdot H_2O$ | A | 222 | 20 | 25.3 |
| 32 Tungstic acid | B | 240 | 15 | 25.0 |
| × Tungstic acid plus Y | B | 240 | 25 | 25.6 |
| 34 Sodium tungstate, $Na_2WO_4\cdot 2H_2O$ | B | 230 | 25 | 28.5 |
| 35 Tungsten disulfide | B | 250 | 27 | 26.4 |
| 36 Tungsten oxytetra-chloride | B | 272 | 3 | 9.2 |
| 37 Tungsten oxytetra-chloride plus X | B | 234 | 20 | 25.6 |
| 38 Lead tungstate | B | 253 | 15 | 25.3 |
| 39 Ammonium tetrathio-tungstate | B | 248 | 20 | 21.7 |
| 40 Zirconium tungstate | B | 231 | 25 | 29.9 |
| 41 Tungsten penta-bromide plus X | B | 248 | 15 | 22.9 |
| 42 Sodium phospho-tungstate | B | 238 | 20 | 25.3 |
| 43 Lathanum oxide | A | 239 | 15 | 22.7 |
| 44 Lanthanum oxide | B | 233 | 20 | 24.9 |
| 45 Neodymium oxide | A | 232 | 20 | 23.3 |
| 46 Neodymium oxide | B | 231 | 25 | 25.0 |
| 47 Yttrium oxide | A | 235 | 20 | 22.9 |
| 48 Yttrium oxide | B | 237 | 20 | 25.6 |
| 49 Didymium oxide | A | 234 | 20 | 22.2 |
| 50 Didymium oxide | B | 228 | 20 | 25.1 |
| 51 Didymium chloride | B | 249 | 10 | 15.3 |
| 52 Didymium chloride plus X | B | 231 | 20 | 23.0 |
| 53 Didymium carbonate | B | 240 | 25 | 27.0 |

A = N-(β-hydroxyethyl) acetamide
B = N-(β-hydroxyethyl) propionamide
X = 1 mole $NaHCO_3$ per mole of halogen
Y = 1 mole of $NaHCO_3$ per mole of catalyst

EXAMPLE 2

Preparation of 2-Ethyl-2-Oxazoline from N-(β-Hydroxyethyl)-Propionamide Using Tungstic Oxide Catalyst

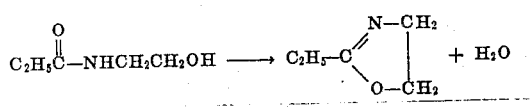

Into a 250 ml. flask fitted with a dropping funnel, stirrer, thermometer and 1 inch diameter, 14 inch Vigreaux column exiting into a condenser, receiver and dry ice-cooled trap connected to a vacuum source, was introduced 37 grams (0.316 mol) of N-(β-hydroxyethyl)-propionamide and 3.0 grams of hydrated tungstic oxide ($WO_3\cdot H_2O$). This mixture was heated with stirring until the reaction began, as evidenced by the evolution of water. This occurred at about 185° C. at which point dropwise addition of 180.0 grams (1.535 mols) of N-(β-hydroxyethyl)-propionamide was begun. The reaction temperature was maintained at 200° C. to 208°C. by controlling the rate of addition of the amide, and the pressure was maintained at 150 mm. of Hg. The amide was added over a period of 1 hour with continuous stirring, during which time distillation occurred at a head temperature of 80° C. to 85° C. (150 mm. Hg.) and was collected in a cooled receiver affording 197 grams of water-white liquid product. Analysis by gas chromatography showed this to contain 151 grams of 2-ethyl-2-oxazoline, 36 grams of water and 10.5 grams of unreacted hydroxamide. An additional 7 grams of higher boiling material was collected after raising the reaction temperature, and it was found to contain 2.5 grams of hydroxyamide but no oxazoline. There remained 9.8 grams of a tarry water-soluble residue. Conversion of the hydroxyamide was about 94 percent and the yield of oxazoline was 88 percent of theory.

EXAMPLE 3

Preparation of 2-Pentadecyl-2-Oxazoline from N-(β-Hydroxyethyl)-Hexadecanamide Using Tungstic Oxide Catalyst

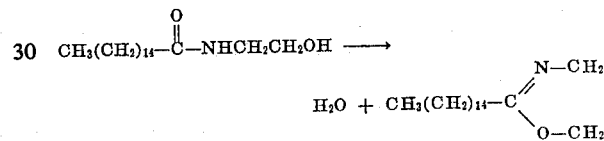

A mixture of 50.0 grams (0.167 mol) of N-(β-hydroxy-ethyl)-hexadecanamide and 3.0 grams of hydrated tungstic oxide ($WO_3\cdot H_2O$) was placed in a 100 ml. flask fitted with a thermometer, stirrer and a spinning band distillation apparatus connected to a condenser, receiver and a dry ice-cooled trap. The mixture was heated with agitation at a pressure of 2 mm. of Hg. until reaction occurred, as evidenced by the evolution of water. The initial reaction temperature was 245° C., and at the end of the reaction it was 300° C. A white solid amounting to 36.1 grams was collected as a distillate at 200° C. to 220° C. (2 mm.) and 1.9 grams of water was obtained in the cooled trap. There remained in the reaction flask 11.5 grams of a light-colored residue. Extraction of the distillate with warm cyclohexane to remove oxazoline left 6 grams of insoluble by-products. The yield, based upon water and cyclohexane-soluble oxazoline obtained was about 63 percent.

EXAMPLE 4

Preparation of 2-Ethyl-2-Oxazoline from N-(β-Hydroxyethyl)-Propionamide Using Sodium Tungstate Catalyst

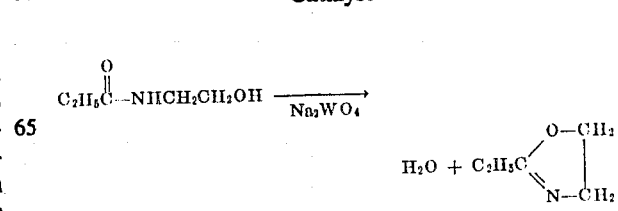

Crude (95 percent) N-(β-hydroxyethyl)-propionamide was dehydrated and cyclized by feeding 2373 grams to a reactor containing 7.5 grams of sodium tungstate ($Na_2WO_4 \cdot 2H_2O$) suspended by a magnetic stirrer in 50 cc. of the hydroxyamide. The reactor was maintained at about 212° to 218° C. at a pressure of 153 mm. Hg. The crude hydroxyamide was fed dropwise at an average rate of 5.5 grams per minute over a period of 7.2 hours. Vapors from the reactor were passed through a 1 inch diameter, 18 inch Vigreaux column to prevent large amounts of hydroxyamide (unreacted) from distilling over with the 2-ethyl-2-oxazoline and water reaction products which were condensed and collected. The distillate came over at a temperature of 77° to 87° C. at a pressure of 153 mm. of Hg. When all of the crude hydroxyamide had been fed to the reactor, the reaction mixture temperature was increased to 234° C. at 153 mm. of Hg. and additional distillate collected at a temperature of up to 111° C. At the end of the reaction, 2243 grams of distillate was obtained, and there were 150 grams of residue in the reactor. Analysis of the distillate by gas chromatography showed it to contain 12.8 percent water, 66.5 percent 2-ethyl-2-oxazoline, 10.1 percent N-(β-hydroxyethyl)-propionamide and 11 percent unidentified side products. This amounted to 1492 grams of 2-ethyl-2-oxazoline. 76.3 percent of the hydroxyamide was converted to oxazoline.

EXAMPLE 5

Preparation of 2-Ethyl- 2-Oxazoline from N-(β-Hydroxyethyl)-Propionamide Using Molybdenum Dioxide Catalyst 30 Grams of N-(β-hydroxyethyl)-propionamide and 3 grams of molybdenum dioxide were reacted as in Example 2 with the following results:

| Time (Min.) | Reaction Temp. (°C.) | Distillation Temp. (°C.) | Amt. Distilled (ml.) | Distillate Appearance |
|---|---|---|---|---|
| 16 | 188 | 58 | 1 drop | clear, colorless |
| 23 | 218 | 100 | 3 | clear, colorless |
| 25 | 222 | 140 | 5 | clear, colorless |
| 30 | 225 | 150 | 10 | clear, colorless |
| 33 | 228 | 152 | 15 | clear, colorless |
| 36 | 235 | 162 | 20 | clear, colorless |
| 40 | 238 | 166 | 25 | clear, colorless |
| 45 | 266 | 138 | 26.5 | clear, colorless |

27.9 Grams of material were recovered (92 percent). 56.4 percent of the recovered material was ethyl oxazoline. The remainder comprised water and uncyclized hydroxyamide.

EXAMPLE 6

Preparation of 2-Heptadecadienyl-2-Oxazoline from N-(β-Hydroxyethyl)-9,11 and 9,12-Octadecadienamide

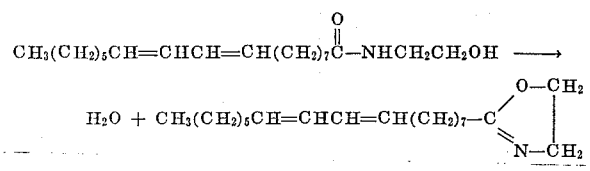

To a three-necked flask fitted with a magnetic stirrer, thermometer, addition funnel and distillation head exiting into a condenser, receiver and dry ice-cooled trap connected to a vacuum source were added 4.0 grams of hydrated tungstic oxide ($WO_3 \cdot H_2O$) and 54.6 grams of N-(β-hydroxyethyl)-linoleamide (linoleic acid is 70/30 9,12- and 9,11-octadecadienoic acid formed by dehydrating castor oil). A vacuum of 0.5 mm. of Hg. was drawn and the reaction mixture heated with stirring. Products began distilling out of the mixture at a reaction temperature of 210° C. which increased rapidly to 239° C. At this point products distilled at a temperature of 190° to 195° C. (1 mm.). Additional hydroxyamide (145.3 grams) was added from time to time until a total of 199.9 grams (0.619 mol) had been charged. The reaction time was 1.5 hours. There was collected 158 grams of almost pure 2-heptadecadienyl-2-oxazoline equivalent to a yield of 83.6 percent based upon the hydroxyamide used. This product was identified as the desired mixed 2-(8,10- and 8,11-heptadecadienyl)-2-oxazoline by infrared spectrographic analysis. There was a strong band at 6.00 microns arising from the C = N stretching and other peaks at 10.15, 10.55, 10.95 and 11.05 microns, which are characteristic of an oxazoline ring. The nuclear magnetic spectrum was consistent with the assigned structure. The starting acid showed 1.85 double bonds per molecule ad did the oxazoline. Results were confirmed by iodine number.

EXAMPLE 7

Preparation of 2-Phenyl-2-Oxazoline From N-(β-Hydroxyethyl)-Benzamide

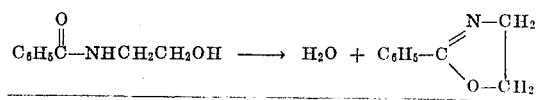

One hundred grams of N-(β-hydroxyethyl)-benzamide and 5 grams of hydrated tungstic oxide ($WO_3 \cdot H_2O$) were charged to a flask fitted with a thermometer, a magnetic driven stirring bar and an 8 inch Vigreaux column distillation head fitted with a condenser, receiver and a dry ice trap. The pressure in the system was reduced to 1 mm. of Hg, and the flask and its contents heated with agitation. When the reaction mixture reached a temperature of about 180° C., water was evolved and collected in the dry ice trap. When most of the water was removed, reaction mixture temperature rose to 190° to 195° C. and product distilled at 110° to 120° C. and was collected in the receiver. Upon completion of the reaction, the flask was allowed to cool and 85 grams of N-(β-hydroxyethyl)-benzamide added and the procedure repeated. The total distillate collected was 147 grams in the receiver with an additional 19 grams water in the dry ice trap. Yield of crude product was 88 percent of theory. Distillation of the crude product through a 20 inch packed fractionating column yielded a center cut boiling at 67° C. at 0.1 mm. Hg. of 121 grams. This amounted to a 73 percent yield of pure oxazoline.

EXAMPLE 8

Non-Catalytic Preparation of 2-Methyl-5,6-Dihydro-1,3-4H-Oxazine From N-(γ-Hydroxypropyl)-Acetamide 30 Grams of N-(γ-hydroxypropyl)-acetamide was heated without catalyst with the following results:

| Time (min.) | Reaction Temp. (°C.) | Distillation Temp. (°C.) | Amt. Distilled (ml.) | Distillate Appearance |
|---|---|---|---|---|
| 30 | 252 | 69 | (1 drop) | colorless, clear |
| 37 | 260 | 113 | 1 | colorless, clear |
| 45 | 266 | 128 | 3 | slight pale straw, clear |
| 50 | 270 | 130 | 5 | pale straw, clear |
| 87 | 278 | 163 | 10 | straw, clear |
| 100 | 310 | 175 | 15 | dark straw, clear |
| 120 | 342 | 170 | 20 | amber, clear |
| 135 | 244 | 140 | 23 | dark amber, clear |
| 145 | 345 | 130 | 23.5 | dark amber, clear |

24.8 Grams of material was recovered (83 percent). A maximum of 37.8 percent of the recovered material (31 percent based on the charged material) was oxazine by gas chromatographic analysis. The analytical results were complex showing six major peaks and four smaller peaks, the largest being the oxazine.

EXAMPLE 9

Preparation of 2-Methyl-5,6-Dihydro-1,3-4H-Oxazine From N-(γ-Hydroxypropyl)-Acetamide Using Hydrated Tungstic Oxide Catalyst

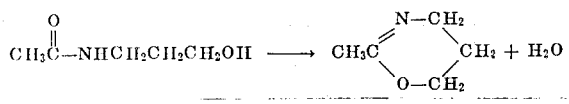

Sixty grams (0.513 mol) of N-(γ-hydroxypropyl)-acetamide and 5.0 grams of hydrated tungstic oxide (WO₃·H₂O 250 ml. flask fitted with a stirrer, thermometer, dropping funnel and a 1 inch diameter, 14 inch long Vigreaux column connected to a condenser, receiver and dry ice-cooled trap. The mixture was heated with stirring to 200° C. at a pressure of 125 mm. of Hg. and an additional 160 grams of hydroxyamide was added over a period of 1 hour from a dropping funnel while maintaining the pressure at 125 mm. of Hg. and the reaction temperature at 200° to 230 ° C. A colorless distillate was collected at about the same rate as the hydroxyamide was being added. 196 Grams distilled over at 95° to 115° C. (125 mm.). Gas chromatographic analysis showed this product to contain 15.5 grams of water, 171 grams of methyl oxazine (2-methyl-5,6-dihydro-1,3-4H-oxazine) and 9.4 grams of hydroxyamide. Yield of methyl oxazine was 91 percent based on the hydroxyamide used.

EXAMPLE 10

Preparation of 2-Unedecyl-5,6-Dihydro-1,3-4H-Oxazine Using Hydrated Tungstic Oxide Catalyst 215 Grams of N-(γ-hydroxypropyl)dodecanomide was reacted with 5 grams of hydrated tungstic oxide (WO₃·H₂O) in accordance with the procedure of Example 9, except that the reaction pressure was 0.3 to 1 mm. and the pot temperature was 245° to 250° C. A total of 163 grams of distillate was obtained comprising predominantly 2-undecyl-5,6-dihydro-1,3-4H-oxazine as shown by gas chromotographic analysis.

EXAMPLE 11

200 Grams of C₇F₁₅(CH₂)₁₀CNHC₂H₄OH N-(β-hydroxyethyl)-12,13,14,15,16,17,18 pentadecafluoro stearamide was reacted with 6 grams of strontium molybdate in accordance with the procedure of Example 9 at a temperature of 230° to 250° C. at 0.05 mm. pressure.

A 72 percent yield of the oxazoline:

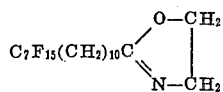

was obtained; $n_D^{23}$ 1.3870, b.p. 110° C. at 0.05 mm.

EXAMPLE 12

Preparation of 2-(3,3,4,4-Tetrafluoro-4-Heptafluoroisopropoxybutyl)-5,6-Dihydro-1,3,4-Oxazine From N-(γ-Hydroxypropyl)-4,4,-5,5-Tetrafluoro-5-Heptafluoroisoproxy Pentanamide

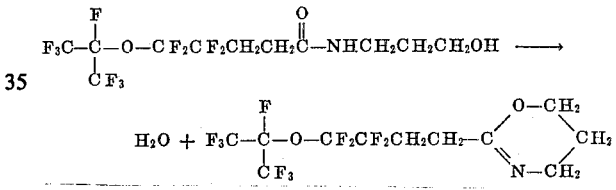

Forty-one grams of the crude hydroxyamide, prepared by the reaction of 4,4,5,5-tetrafluoro-5-heptafluoroisoproxy pentanoic acid with 3-aminopropanol, and 5 grams of tungstic oxide (WO₃·H₂O) were placed in a flask fitted with an agitator, thermometer and Vigreaux column attached to a distillate receiving system. The mixture was heated with agitation until reaction began at a temperature of about 210° C. and the pressure reduced to effect distillation. Thirty-one grams of distillate was collected over a period of 1 hour at reaction temperatures from 190° to 230° C. and distillation temperatures of 125° C. to 140° C. at pressures of from 65 to 170 mm. of Hg. There remained in the reaction flask 7.2 grams of residue.

The 31 grams of distillate was taken up in 50 cc. of benzene, whereupon 4.5 grams of water separated from the solution. After distillation of the benzene at atmosphereic pressure, the residue was distilled at a pressure of 8 mm. Hg. to yield a first cut of 4.8 grams of boiling point 75° to 81° C., a second cut of 9.2 grams of boiling point 81° to 82° C., and a third cut of 2.0 grams of boiling point 82° C. at 8 mm. to 95° C. at 0.5 mm. There was 8.1 grams of residue. Cut number 2 was found to be the desired oxazine. Analysis by gas chromatography showed it to be essentially pure, and it was further characterized by infrared analysis. The spectra were compatible with the proposed structure showing strong fluoro groups and absorption at 595 microns for the —C=N— of the oxazine ring. Cut Number 1 was found to consist mainly of the oxazine with some impurity; cut Number 3 was not identified; the 8.1 grams of residue comprised 95 percent unreacted hydroxyamide.

EXAMPLE 13

Synthesis of 2-Heptyl-5,6-Dihydro-1,3-4H-Oxazine by the cyclodehydration of N-γ-Hydroxypropyloctanamide To a round bottom flask equipped with a magnetic stirrer, a thermometer, an addition funnel, and a vacuum takeoff was added 2.0 grams of tunstic acid and 25.0 grams of N - γ-hydroxyproploctanamide. The pressure was reduced to 0.2 mm., the pot was heated and the contents were stirred magnetically. The flask temperature was kept 175° to 195° C. and the oxazine began distilling over. Hydroxyamide was added at such a rate, that the level in the flask was kept constant. A total of 50.0 grams of hydroxyamide was added and 39.5 grams of material distilled over. 2.36 Grams of water were evolved during the reaction. The distillate was 55 percent 2-heptyloxazine, 42 percent unreacted starting material and about 3 percent unidentified impurity.

The oxazine boils at 74° to 77° C. at 0.02 to 0.1 mm. The structure of the product confirmed both by N.M.R. and by I.R.:

Calc'd for: $C_{11}H_{21}NO$: C, 72.0%; H, 11.55%; N, 7.64%
Found: C, 72.66%; H, 11.43%; N, 7.67%

We claim:
1. A process for the preparation of a cyclic iminoether having the formula

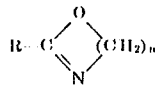

wherein R represents a substituent selected from the group consisting of hydrogen and aliphatic, alicyclic and monocyclic aromatic hydrocarbons having up to 20 carbon atoms and jointed perfluoroalkylalkyl radicals of the structure $CF_3(CF_2)_r(CH_2)_s$, wherein r and s range from 0 to 10 and the sum of r plus s is from 1 to 20, and n is 2 or 3; comprising heating a hydroxylalkylamide having the formula

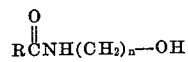

wherein R and n are as defined above, at a temperature of from about 140° C. to about 300° C., in the presence of from 0.01 to 15 weight percent of catalyst material selected from the group consisting of formates, acetates, benzoates, naphthenates, oxalates, acetylacetonates and methyl, phenyl, p-tolyl and p-bromobenzene sulfonates of the metals manganese in the plus 3 and plus 4 valence state, cobalt in the plus 2 state, the rare earth metals in the plus 3 state and molybdenum and tungsten in the plus 4 to plus 6 state, wherein said catalyst material is soluble in said hydroxyalkylamide to the extent of at last about 100 ppm. at 300° C.

2. A process in accordance with claim 1 wherein there is present in conjunction with said catalyst material an approximately equimolar amount of an inorganic base selected from the group consisting of alkali and alkaline earth metal oxides, hydroxides, carbonates and bicarbonates.

3. A process in accordance with claim 2 wherein said inorganic base is sodium bicarbonate.

4. A process in accordance with claim 1 wherein said heating is effected in the presence of from 0.01 to 2 weight percent of catalyst material.

5. A process in accordance with claim 1 wherein said heating is carried out at a sub-atmospheric pressure of below about 500 mm. of mercury.

6. A process in accordance with claim 1 wherein said heating is carried out at a temperature of from about 180° C. to about 250° C.

7. A process in accordance with claim 1 wherein n is 3 and R is a member selected from the group consisting of methyl and ethyl.

* * * * *